(12) United States Patent
Hamamoto et al.

(10) Patent No.: US 7,350,858 B2
(45) Date of Patent: Apr. 1, 2008

(54) VEHICULAR BACK TRIM

(75) Inventors: Katsuhiro Hamamoto, Hiroshima (JP);
Seiji Shohara, Higashihiroshima (JP);
Masaru Kihara, Higashihiroshima (JP);
Eiji Harada, Hiroshima (JP)

(73) Assignees: DaikyoNishikawa Corporation,
Hiroshima (JP); **Mazda Motor
Corporation**, Hiroshima (JP)

( * ) Notice: Subject to any disclaimer, the term of this patent is extended or adjusted under 35 U.S.C. 154(b) by 427 days.

(21) Appl. No.: 11/063,593

(22) Filed: Feb. 24, 2005

(65) Prior Publication Data

US 2006/0061153 A1  Mar. 23, 2006

(30) Foreign Application Priority Data

Mar. 29, 2004  (JP) ............................. 2004-096760

(51) Int. Cl.
*A47C 7/62* (2006.01)

(52) U.S. Cl. ..................... 297/188.04; 297/188.07; 297/182; 296/37.8

(58) Field of Classification Search ............... 297/182, 297/188.04, 188.07; 296/37.8
See application file for complete search history.

(56) References Cited

U.S. PATENT DOCUMENTS

| 2,619,395 | A | * | 11/1952 | Kent | ..................... | 297/188.07 |
| 3,254,931 | A | * | 6/1966 | Jacobi | ................... | 297/188.07 |
| 6,494,533 | B1 | * | 12/2002 | Bohler | .................. | 297/188.04 |
| 6,601,913 | B2 | * | 8/2003 | Romca et al. | ......... | 297/188.04 |

FOREIGN PATENT DOCUMENTS

| FR | 2714639 | 7/1995 |
| JP | 2000-177399 | 6/2000 |
| WO | WO 02/066295 | 8/2002 |

* cited by examiner

*Primary Examiner*—Anthony D. Barfield
(74) *Attorney, Agent, or Firm*—Nixon Peabody LLP; Donald R. Studebaker (57) ABSTRACT

A vehicular back trim of the present invention includes a bulge formed in the middle of the vehicle width and between right and left seats to protrude more forward than the rear surfaces of seatbacks of the seats. A center container is formed to extend rearward from the front side of the bulge and behind-seatback containers are formed to extend rearward from the surface located behind the seatbacks of the seats.

11 Claims, 8 Drawing Sheets

VEHICULAR BACK TRIM

CROSS-REFERENCE TO RELATED APPLICATION

This non-provisional application claims priority under 35 U.S.C. §119(a) on Patent Application No. 2004-96760 filed in Japan on Mar. 29, 2004, the entire contents of which are hereby incorporated by reference.

BACKGROUND OF THE INVENTION (a) Field of the Invention

The present invention relates to a vehicular back trim which covers a kick-up portion arranged in a rear part of a vehicle cabin to extend upward from a front floor portion with rearward inclination.

(b) Description of Related Art

Vehicular back trims of this kind have been known heretofore. For example, Japanese Unexamined Patent Publication No. 2000-177399 discloses a vehicular back trim including a center container extending rearward from the front side of a bulge formed in the middle of the vehicle width and between right and left seats to protrude more forward than the rear surfaces of seatbacks of the seats.

However, the conventional vehicular back trim has a problem in that space behind the seatbacks is not effectively used as luggage space.

Further, the center container in the middle of the vehicle width and between the seats is not safe enough to protect luggage from theft because it is visible from the outside of the vehicle.

SUMMARY OF THE INVENTION

The present invention has been achieved in view of the above problems. An object of the present invention is to surely protect the luggage from theft and to increase luggage capacity by making effective use of space behind the seatbacks.

To achieve the above object, the present invention provides luggage containers behind the seatbacks.

More specifically, according to a first invention, there is provided a vehicular back trim which covers a kick-up portion arranged behind right and left seats to extend upward from a front floor portion, the vehicular back trim including: a bulge which is formed to protrude forward in the middle of the vehicle width and between the seats; a center container which extends rearward from the front side of the bulge; and behind-seatback containers which extend rearward from the surface located behind seatbacks of the seats.

With the above configuration, the space behind the seatbacks is effectively used to provide behind-seatback containers, thereby increasing the luggage capacity to a great extent. Since the containers are hidden behind the seatbacks, the luggage contained therein is less prone to be stolen. Further, even if the middle of the vehicle width and between the seats bulges forward, a travel distance of the seats is not reduced. Therefore, the capacity of the center container is ensured. Moreover, the center container is provided between the seats and therefore can be used even if the seats are occupied. Thus, the vehicular back trim of the present invention surely allows protection of the luggage from theft and an increase in luggage capacity, thereby offering excellent usability to the users.

According to a second invention, the center container includes a lid which covers a front opening of the center container and the lid has an open/close lock With this configuration, the lid prevents the luggage contained in the center container from popping out. Further, the lock prevents the luggage from theft.

According to a third invention, each of the behind-seatback containers includes a lower cover for covering a lower part of an opening of the container.

With this configuration, the covers prevent the luggage in the behind-seatback containers from popping out.

According to a fourth invention, each of the behind-seatback containers includes a lid which entirely covers an opening thereof and the lid has a hinge-like part at a lower part thereof.

With this configuration, the lids surely conceal the luggage in the behind-seatback containers and reliably prevent the luggage from popping out. Further, with the hinge-like parts provided at the lower parts of the lids, the lids are easy to open when the seatbacks are tilted forward and the luggage in the behind-seatback containers can be reached with ease.

According to a fifth invention, the bulge in the middle of the vehicle width and between the seats protrudes more forward than the rear surfaces of the seatbacks of the seats.

According to a sixth invention, the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar.

With this configuration, dead space between the rear floor portion and the cross bar is effectively used to increase the luggage capacity.

According to a seventh invention, the back trim is made of resin and molded in one piece.

With this configuration, the center container and the behind-seatback containers are integrally molded with other parts, thereby allowing much easier assembly than the case where they are formed separately. Further, steady strength is given to the back trim irrespective of accuracy in assembly because there is no need to join the separated center container and behind-seatback containers with other parts.

According to an eighth invention, the back trim further includes extended portions which are located at both sides of a center tunnel bulging in the middle of the front floor portion in the vehicle width direction and extend toward the front floor portion along the kick-up portion, the extended portions being fixed to the kick-up portion.

With this configuration, the vehicular back trim is extended to the front floor portion so as to straddle the center tunnel. That is, the back trim covers the kick-up portion, thereby eliminating the need for extending a floor carpet on the front floor portion upward to cover the kick-up portion. Accordingly, the back side of the floor carpet will not be exposed, thereby enhancing the appearance and facilitating the placement of the floor carpet. Moreover, the back trim increases in rigidity because it is engaged to the kick-up portion.

According to a ninth invention, the extended portions cover seat belt retractors placed in openings formed in a lower part of the kick-up portion.

If the floor carpet is arranged to cover the seat belt retractors and seat belts arranged in the openings in the lower part of the kick-up portion, the floor carpet may be sagged to contact the seat belt. According to the present invention, however, the trim covers the seat belt retractors and the seat belts without contacting the seat belts, thereby eliminating the need for using another member which sags less. Thus, the seat belt retractors and the seat belts are effectively masked.

According to a tenth invention, there is provided a vehicular back trim which covers a kick-up portion arranged behind right and left seats to extend upward from a front floor portion with rearward inclination, wherein the back trim is made of resin and includes: a bulge which is formed in the middle of the vehicle width and between the seats to protrude more forward than the rear surfaces of seatbacks of the seats; a center container which extends rearward from the front side of the bulge; a lid which covers the center container and has an open/close lock; behind-seatback containers which extend rearward from the rear surfaces of the seatbacks of the seats; and lower covers which cover lower parts of openings of the behind-seatback containers, respectively, and wherein the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar, and the back trim further comprises extended portions which are located at both sides of a center tunnel bulging in the middle of the front floor portion in the vehicle width direction and extend toward the front floor portion along the kick-up portion, the extended portions being fixed to the kick-up portion and covering seat belt retractors placed in openings formed in a lower part of the kick-up portion, respectively.

According to an eleventh invention, there is provided a vehicular back trim which covers a kick-up portion arranged behind right and left seats to extend upward from a front floor portion with rearward inclination, wherein the back trim is made of resin and includes: a bulge which is formed in the middle of the vehicle width and between the seats to protrude more forward than the rear surfaces of seatbacks of the seats; a center container which extends rearward from the front side of the bulge; a lid which covers the center container and has an open/close lock; behind-seatback containers which extend rearward from the rear surfaces of the seatbacks of the seats; and lids which entirely cover openings of the behind-seatback containers and have hinge-like parts at lower parts thereof, respectively, and wherein the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar, and the back trim further comprises extended portions which are located at both sides of a center tunnel bulging in the middle of the front floor portion in the vehicle width direction and extend toward the front floor portion along the kick-up portion, the extended portions being fixed to the kick-up portion and covering seat belt retractors placed in openings formed in a lower part of the kick-up portion, respectively.

DETAILED DESCRIPTION OF THE INVENTION

Hereinbelow, an explanation is given of an embodiment of the present invention with reference to the drawings.

Figure 1:
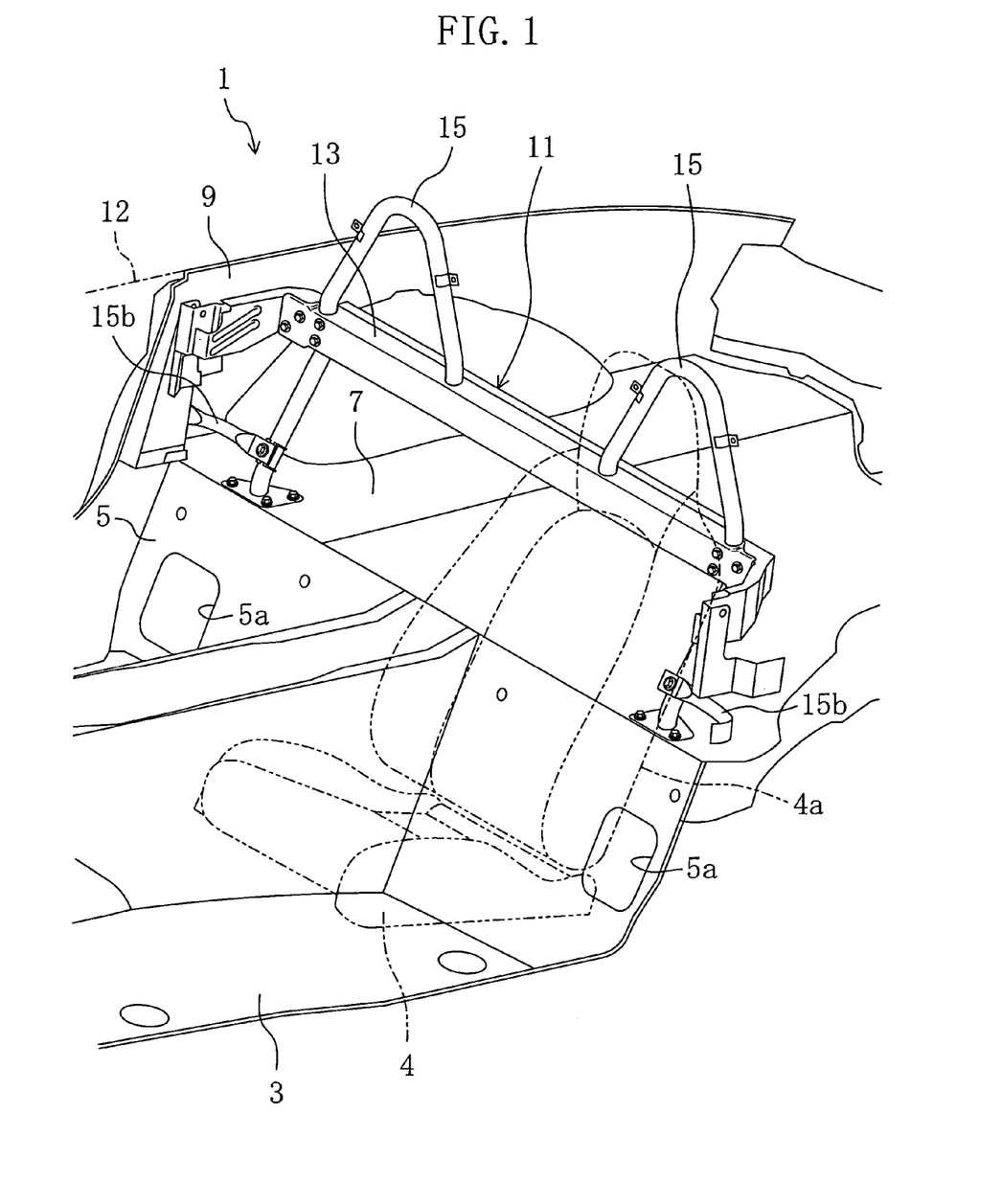
FIG. 1 is an oblique view illustrating a behind-seat part of a bodywork frame of a convertible.

FIG. 1 shows a part of a bodywork frame 1 of a convertible behind a seat 4 (indicated with a chain double-dashed line in FIG. 1). The bodywork frame 1 includes a front floor portion 3, a kick-up portion 5 extending upward from the front floor portion 3 with rearward inclination, a rear floor portion 7 extending behind the kick-up portion 5 and right and left side panels 9 in the vehicle width direction. In FIG. 1, the left side panel 9 is omitted.

A roll bar assembly 11 is arranged to connect the right and left side panels 9. The roll bar assembly 11 includes a cross bar 13 arranged at a level lower than a beltline 12 of the convertible and two substantially inverted U-shaped roll bars 15 arranged to protrude upward from the cross bar 13. The cross bar 13 extends in the vehicle width direction behind the seat 4 and its both ends are connected to the side panels 9 behind right and left side doors, respectively.

Figure 2:
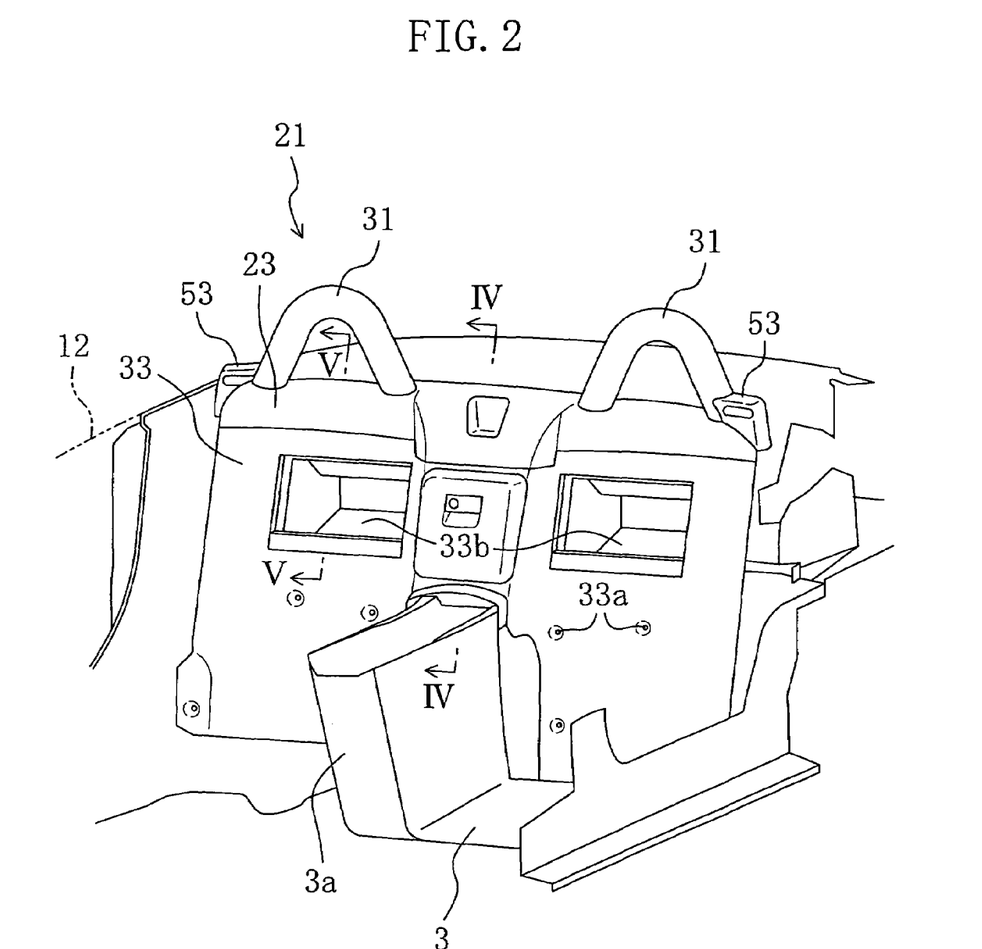
FIG. 2 is an oblique view illustrating the behind-seat part of the bodywork frame to which a vehicular back trim according to an embodiment of the present invention is attached.

As shown in FIG. 2, the cross bar 13 and the roll bars 15 are almost entirely covered with a vehicular trim 21 made of resin. More specifically, the vehicular trim 21 includes a front trim 23 arranged at the front of the cross bar 13 to be engaged to the front wall of the cross bar 13, a rear trim 25 (shown in FIG. 4) arranged behind the cross bar 13 to be engaged to the rear wall of the cross bar 13, substantially inverted U-shaped garnishes 31 covering the corresponding projections on the roll bars 15 and a vehicular back trim 33 of the present embodiment extending from the lower end of the front trim 23 toward the front floor portion 3. The top face of the vehicular trim 21 covering the cross bar 13 is at the same level as the beltline 12.

Figure 4:
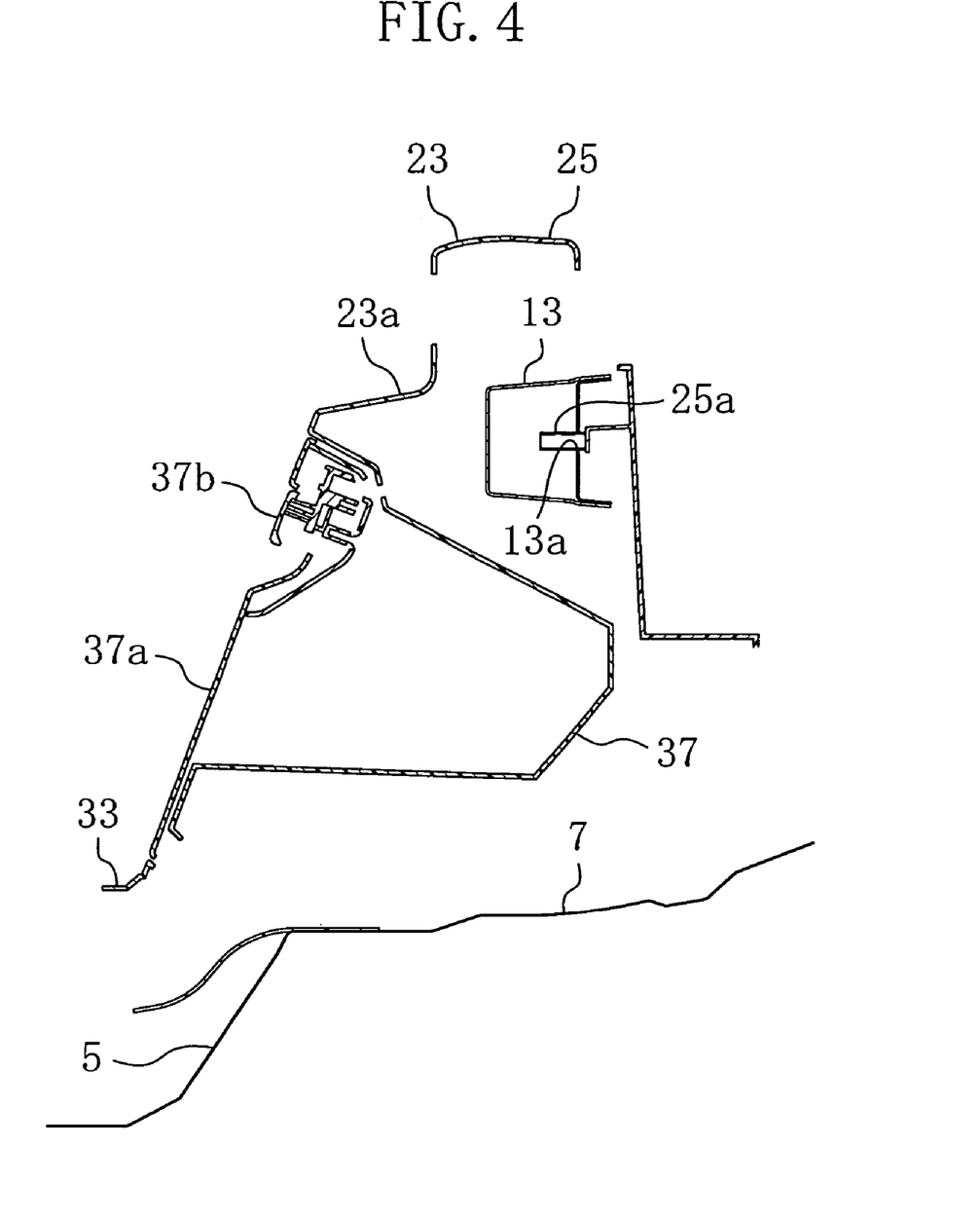
FIG. 4 is an enlarged cross section cut along the line IV-IV indicated in FIG. 2.

As shown in FIG. 4, the rear trim 25 is positioned relative to the cross bar 13 by inserting a positioning pin 25a provided on the rear wall of the rear trim 25 into a positioning through hole 13a formed in the rear wall of the cross bar 13. The rear trim 25 is then fixed to the cross bar 13 with a fastener or the like which is not shown.

Though not shown in detail, the front trim 23 is shaped to correspond with the rear trim 25 and engaged to the front wall of the cross bar 13. The front and rear trims 23 and 25 are engaged to each other via engagement parts (not shown) formed on the top ends of the front and rear trims 23 and 25.

As shown in FIG. 2, the front trim 23 is engaged to the back trim 33 of the vehicular trim 21. The back trim 33 extends toward the front floor portion 3 along the kick-up portion 5 and has a lower part partly cut away to straddle a center tunnel 3a which bulges in the middle of the front floor portion 3 in the vehicle width direction and extends in the vehicle length direction. That is, the back trim 33 includes extended portions 33c which are located at both sides of the center tunnel 3a bulging in the middle of the front floor portion 3 in the vehicle width direction and extend toward the front floor portion 3 along the kick-up portion 5. Further, the back trim 33 has a plurality of fastener insertion holes 33a for fixing the back trim 33 to the kick-up portion 5 with fasteners (not shown).

Figure 3:
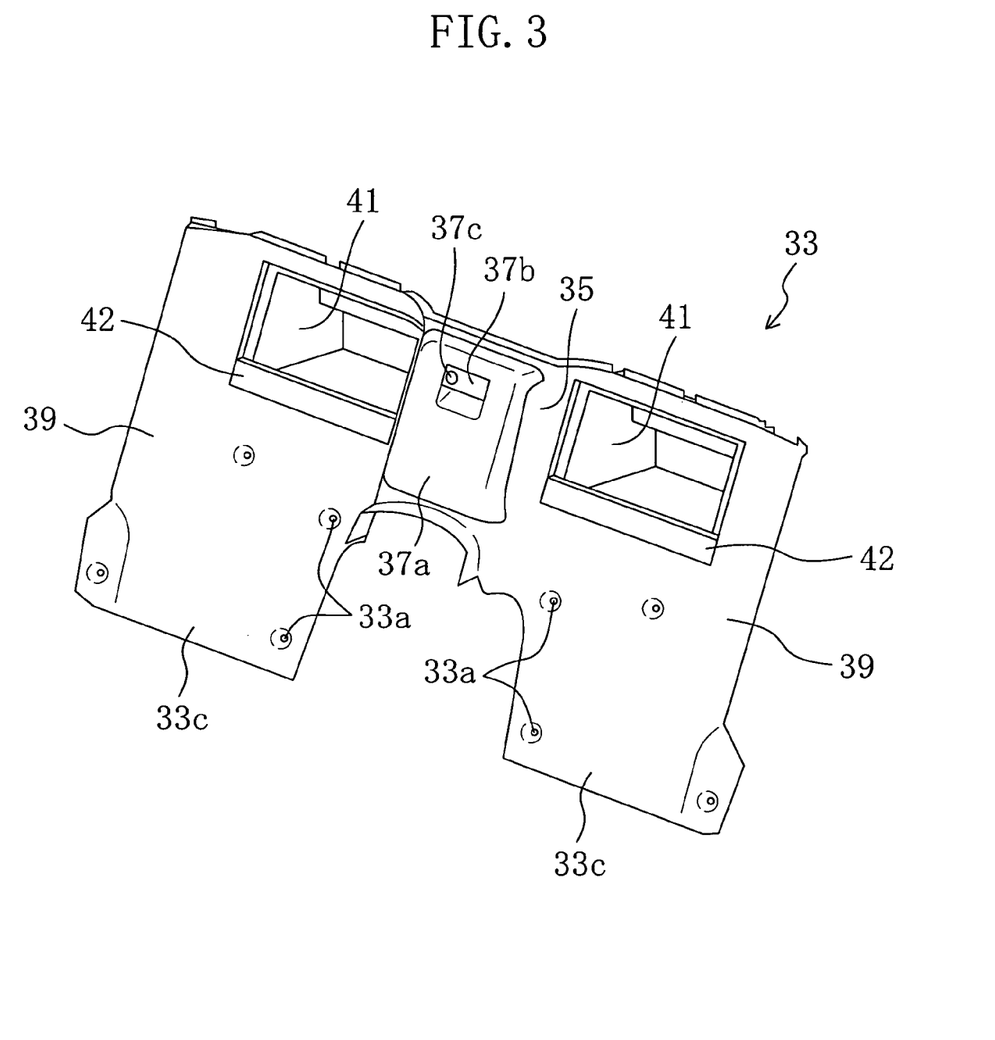
FIG. 3 is an oblique view illustrating the vehicular back trim.
Figure 5:
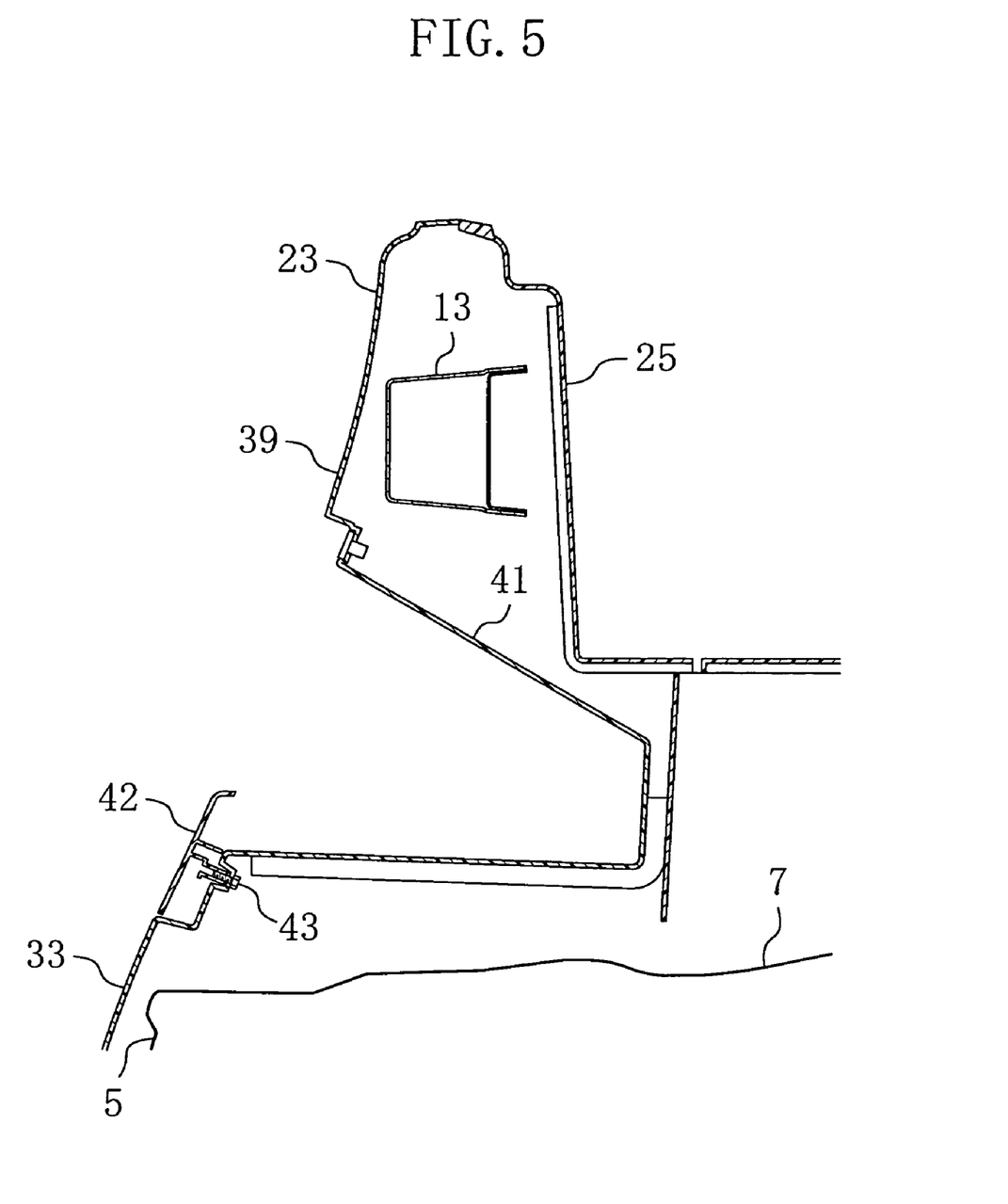
FIG. 5 is an enlarged cross section cut along the line V-V indicated in FIG. 2.

As shown in FIGS. 3 to 5, the vehicular trim 21 includes a bulge 35, which is a feature of the present invention, formed in the middle of the vehicle width and between the right and left seats 4 such that the bulge 35 protrudes more forward than the rear surfaces of seatbacks 4a of the seats 4. In the bulge 35, a center container 37 extending rearward from the front side of the bulge 35 is formed. Further, in flat portions 39 of the vehicular trim 21 behind the seatbacks 4a, behind-seatback containers 41 extending rearward from the surfaces of the flat portions 39 are formed. The back trim 33 is made of an integrally molded resin product including the center container 37, flat portions 39 and behind-seatback containers 41.

The center container 37 and the behind-seatback containers 41 are formed to extend rearward between the rear floor portion 7 extending rearward from the kick-up portion 5 and the cross bar 13 extending in the vehicle width direction above the rear floor portion 7 to connect the right and left side panels 9 in the rear part of the vehicle body. The center container 37 and the behind-seatback containers 41 extend more rearward than the cross bar 13.

A front opening of the center container 37 is covered with a lid 37a to prevent luggage contained therein from popping out. The lid 37a is opened by pulling up a grip 37b formed in an upper part of the lid 37a. The grip 37b is provided with an antitheft lock 37c.

The behind-seatback containers 41 extend more rearward than the center container 37, ensuring their luggage capacities. Each of the behind-seatback containers 41 has a lower cover 42 which covers a lower part of the opening of the container 41 to prevent the luggage contained therein from popping out. The lower cover 42 is fixed to the back trim 33 with a bolt 43.

Figure 6:
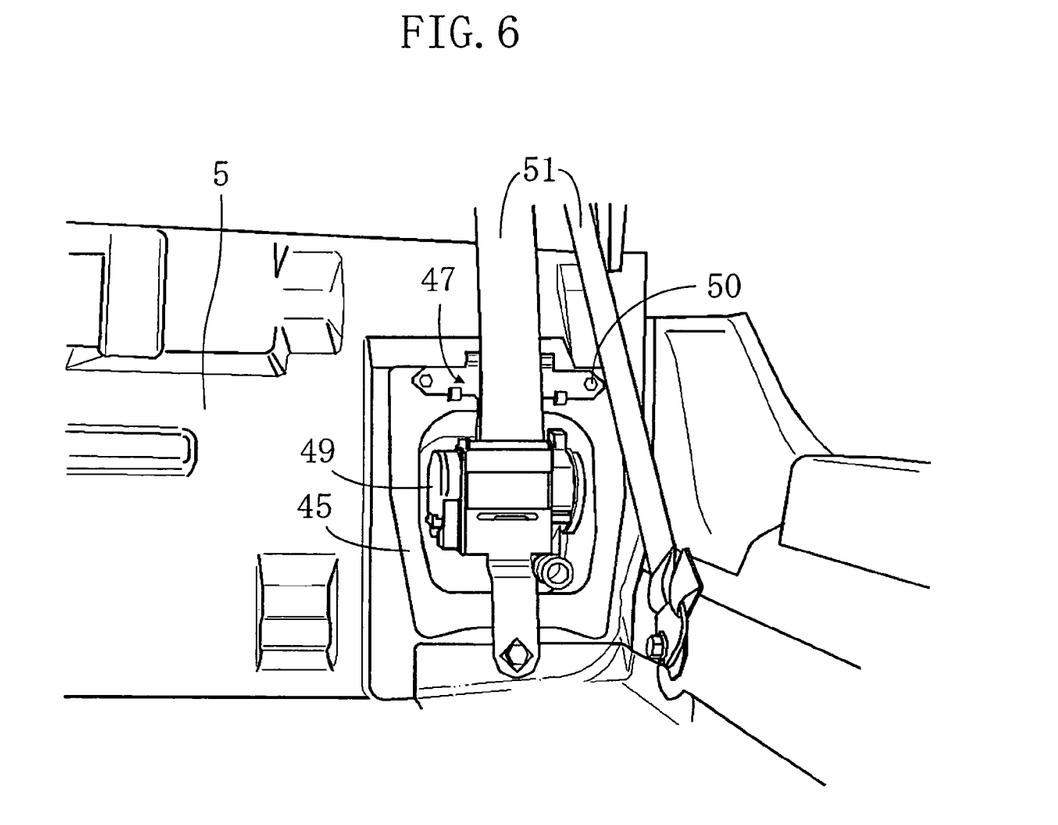
FIG. 6 is an enlarged oblique view illustrating the vicinity of a seat belt retractor.

Further, as shown in FIG. 1, substantially rectangular installation holes 5a are opened in a lower part of the kick-up portion 5 at both ends in the vehicle width direction. As shown in FIG. 6, resin-made covers 45, each of which protrudes rearward to have a substantially horizontally laid U-shaped cross section, are fitted in the installation holes 5a, respectively. Then, inside each of the covers 45, a seat belt retractor 49 is placed via a T-shaped retractor bracket 47 formed across the installation hole 5a.

A seat belt 51 extending from each of the seat belt retractors 49 is passed inside of the vehicular trim 21 to reach a shoulder 53 formed on each end of the front trim 23 in the vehicle width direction as shown in FIG. 2, whereby the seat belt can be drawn out of the shoulder 53 toward the occupant.

Effect of the Embodiment

With use of the vehicular back trim 33 according to the present embodiment, users can optionally choose the behind-seatback containers 41 which make efficient use of space behind the seatbacks 4a and are invisible from the outside or the center container 37 provided in the middle of the vehicle width and between the seatbacks 4a. Thus, the vehicular back trim 33 of the present embodiment surely allows protection of the luggage from theft and an increase in luggage capacity, thereby offering excellent usability to the users.

Since the center container 37 and the behind-seatback containers 41 extend more rearward than the cross bar 13 between the rear floor portion 7 and the cross bar 13, dead space is effectively used to increase the luggage capacity.

The center container 37 and the behind-seatback containers 41 are formed integrally with other parts, thereby allowing much easier assembly and giving steady strength to the vehicular trim.

Further, since the vehicular back trim 33 is extended to the front floor portion, the back trim 33 improves in rigidity. In addition, the back side of the floor carpet is not exposed, thereby enhancing the appearance. The vehicular back trim 33 is engaged to the kick-up portion 5, thereby improving in rigidity.

Moreover, since the seat belt retractor 49 and the seat belt 51 are covered with the vehicular back trim 33 which sags less, the seat belt retractor 49 and the seat belt 51 can effectively be masked.

Alternative Example of the Embodiment

Figure 7:
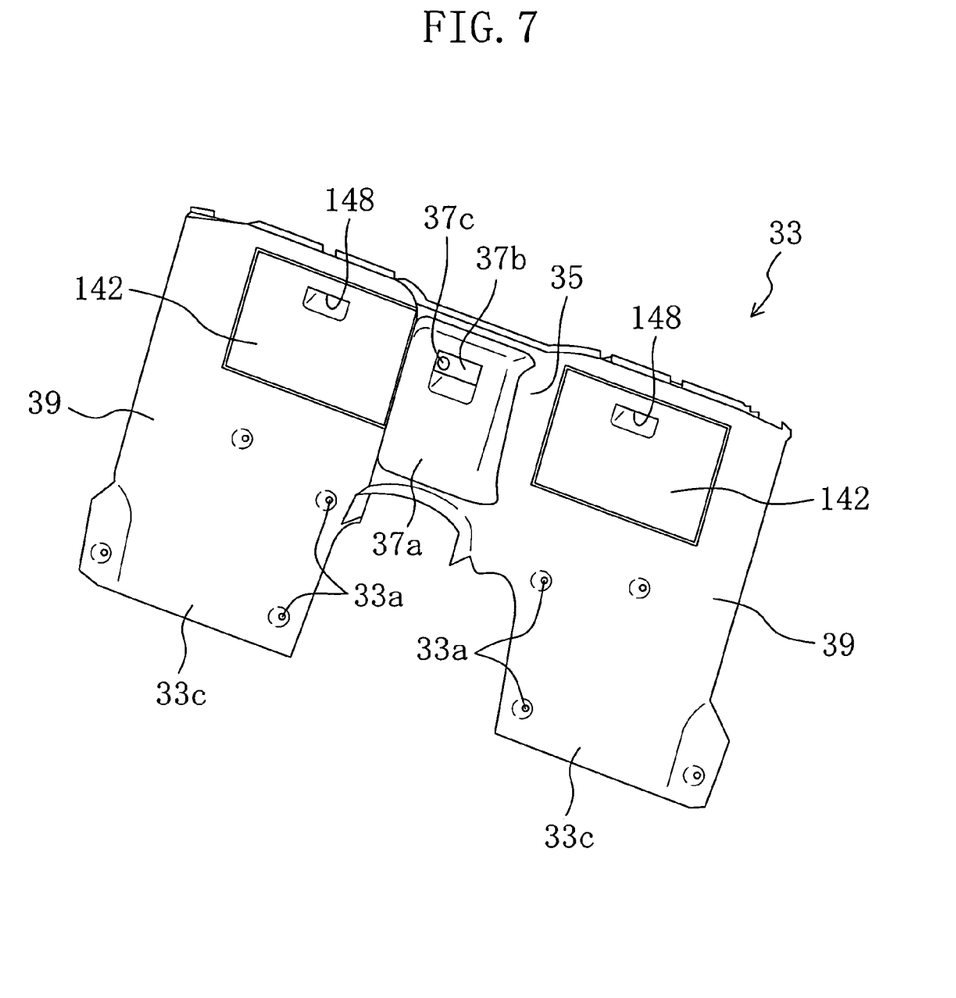
FIG. 7 is a view corresponding to FIG. 3 illustrating an alternative example of the embodiment.
Figure 8:
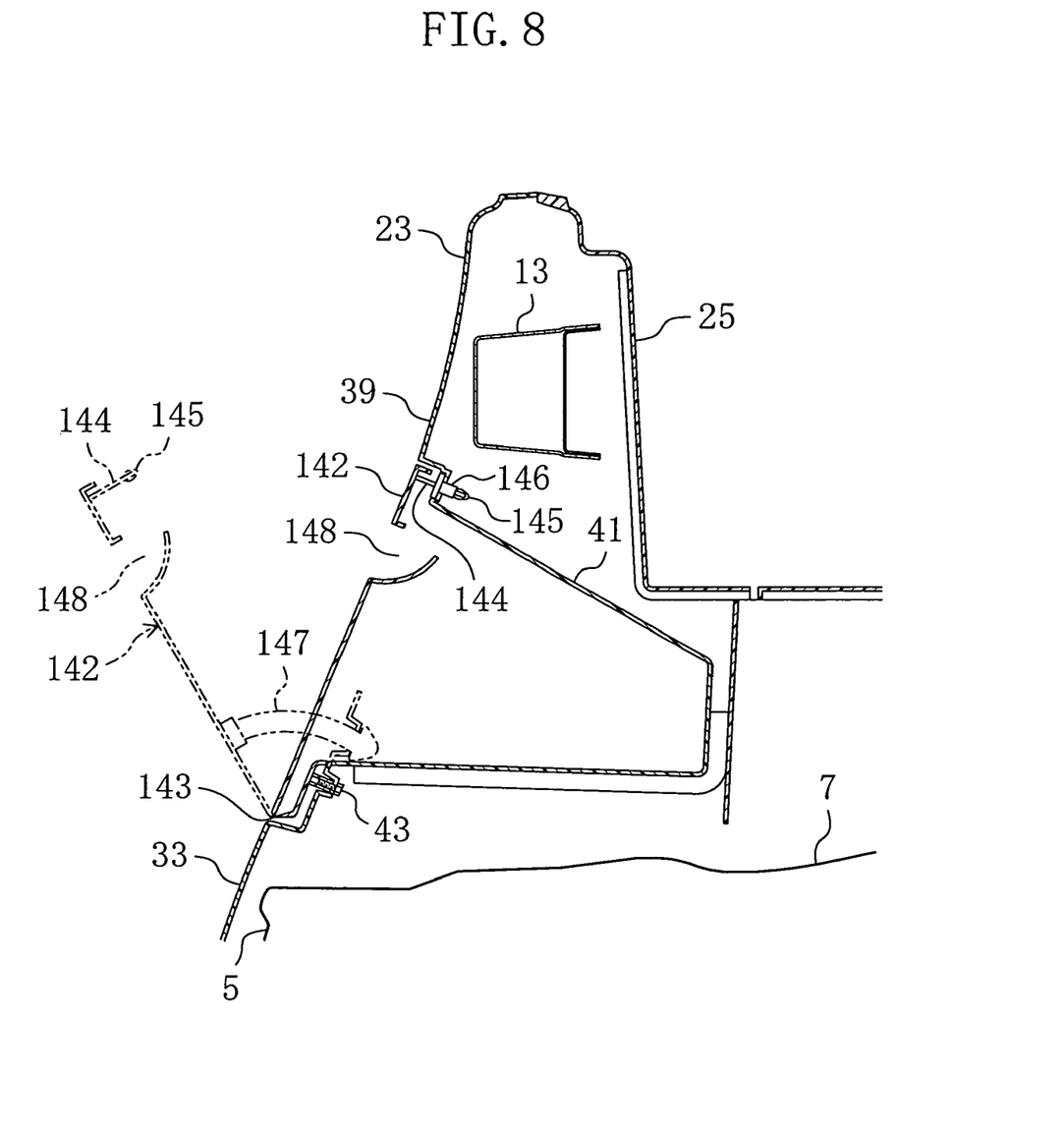
FIG. 8 is a view corresponding to FIG. 5 illustrating the alternative example of the embodiment.

FIGS. 7 and 8 show an alternative example of the vehicular back trim 33 according to the present embodiment. The behind-seatback containers 41 of the vehicular back trim 33 include resin-made lids 142 which are in the form of a rectangular plate and entirely cover the openings of the behind-seatback containers 41, respectively. Each of the lids 142 has a hinge-like part 143 at a lower part thereof which is formed thinner than the other part. The lid 142 further includes a nail 144 protruding rearward from the top end of the lid 142. A clip 145 crimped onto the tip of the nail 144 is engaged with a hole 146 opened at the top end of the behind-seatback container 41, whereby the lid 142 covers the behind-seatback container 41. Further, an arcuate stopper 147 is provided on the rear surface of the lid 142. Therefore, when opened, the lid 142 is held to form an angle of about 50° with a flat part 39 of the back trim 33. The lid 142 further includes a concave part 148 so that a user's hand catches it to open the lid 142. The hinge-like part 143, nail 144, arcuate stopper 147 and concave part 148 are integrally formed with the lid 142. The lower edge part of the lid 142 is fixed to the back trim 33 with a bolt 43.

With the above-described configuration, the lids 142 surely conceal the luggage in the behind-seatback containers 41 and reliably prevent the luggage from popping out. Further, with the thinned hinge-like parts 143 provided at the lower parts of the lids 142, the lids 142 are easy to open when the seatbacks 4a are tilted forward and the luggage in the behind-seatback containers 41 can be reached with ease.

Other Embodiment

In addition to the above embodiment, the present invention may be configured as follows.

More specifically, a rearward portion of the upper wall of each of the behind-seatback containers 41 may be engaged to the lower end of the rear trim 25. By so doing, higher rigidity is given to the behind-seatback container 41, thereby raising the weight limit of the luggage contained therein.

The front trim 23 and the back trim 33 are formed separately in the above embodiment, but they may be formed in one piece.

Although the garnish 31 is separated from the front and rear trims 23 and 25 in the above embodiment, the front half of the garnish 31 may be molded integrally with the front trim 23 and the rear half of the garnish 31 may be molded integrally with the rear trim 25.

The above embodiment is an inherently preferable example and does not intend to limit the present invention, subjects to which the present invention is applied or applicable scope of the present invention.

What is claimed is:

1. A vehicular back trim which covers a kick-up portion arranged behind right and left seats to extend upward from a front floor portion, the vehicular back trim including:
    a bulge which is formed in the middle of the vehicle in the width direction to protrude forward with respect to the vehicle;
    a center container which is formed on the front side portion of the bulge to extend rearward with respect to the vehicle; and
    behind-seatback containers which are formed on the trim located behind seatbacks of the seats to extend rearward with respect to the vehicle.

2. A back trim according to claim 1, wherein
    the center container includes a lid which covers a front opening of the center container and the lid has an open/close lock.

3. A back trim according to claim 1, wherein
    each of the behind-seatback containers includes a lower cover for covering a lower part of an opening thereof.

4. A back trim according to claim 1, wherein
    each of the behind-seatback containers includes a lid which entirely covers an opening thereof and the lid has a hinge-like part at a lower part thereof.

5. A back trim according to claim 1, wherein
    the bulge in the middle of the vehicle width and between the seats protrudes more forward than the rear surfaces of the seatbacks of the seats.

6. A back trim according to claim 1, wherein
    the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar.

7. A back trim according to claim 6, which is made of resin and molded in one piece.

8. A back trim according to claim 1 further including:
    extended portions which are located at both sides of a center tunnel bulging in the middle of the front floor portion in the vehicle width direction and extend toward the front floor portion along the kick-up portion, the extended portions being fixed to the kick-up portion.

9. A back trim according to claim 8, wherein
    the extended portions cover seat belt retractors placed in openings formed in a lower part of the kick-up portion.

10. A vehicular back trim which covers a kick-up portion arranged behind right and left seats to extend upward from a front floor portion with rearward inclination, wherein
    the back trim is made of resin and includes:
    a bulge which is formed in the middle of the vehicle width and between the seats to protrude more forward than the rear surfaces of seatbacks of the seats;
    a center container which extends rearward from the front side of the bulge;
    a lid which covers the center container and has an open/close lock;
    behind-seatback containers which extend rearward from the rear surfaces of the seatbacks of the seats; and
    lower covers which cover lower parts of openings of the behind-seatback containers, respectively,
    wherein the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar, and
    the back trim further comprises extended portions which are located at both sides of a center tunnel bulging in the middle of the front floor portion in the vehicle width direction and extend toward the front floor portion along the kick-up portion, the extended portions being fixed to the kick-up portion and covering seat belt retractors placed in openings formed in a lower part of the kick-up portion, respectively.

11. A vehicular back trim which covers a kick-up portion arranged behind right and left seats to extend upward from a front floor portion with rearward inclination, wherein
    the back trim is made of resin and includes:
    a bulge which is formed in the middle of the vehicle width and between the seats to protrude more forward than the rear surfaces of seatbacks of the seats;
    a center container which extends rearward from the front side of the bulge;
    a lid which covers the center container and has an open/close lock;
    behind-seatback containers which extend rearward from the rear surfaces of the seatbacks of the seats; and
    lids which entirely cover openings of the behind-seatback containers and have hinge-like parts at lower parts thereof, respectively, and
    wherein the center container and the behind-seatback containers extend rearward between a rear floor portion connected to and behind the kick-up portion and a cross bar extending in the vehicle width direction above the rear floor portion to connect a right side panel and a left side panel arranged in the rear part of a vehicle body, the center container and the behind-seatback containers extending more rearward than the cross bar, and
    the back trim further comprises extended portions which are located at both sides of a center tunnel bulging in the middle of the front floor portion in the vehicle width direction and extend toward the front floor portion along the kick-up portion, the extended portions being fixed to the kick-up portion end covering seat belt retractors placed in openings formed in a lower part of the kick-up portion, respectively.

* * * * *

UNITED STATES PATENT AND TRADEMARK OFFICE
CERTIFICATE OF CORRECTION

PATENT NO. : 7,350,858 B2
APPLICATION NO. : 11/063593
DATED : April 1, 2008
INVENTOR(S) : Katsuhiro Hamamoto et al.

It is certified that error appears in the above-identified patent and that said Letters Patent is hereby corrected as shown below:

Title Page, Item (75) Inventors should read

-- (75) Inventors: Katsuhiro Hamamoto, Hiroshima (JP)
              Seiji Shohara, Hiroshima (JP)
              Masaru Kihara, Hiroshima (JP)
              Eiji Harada, Hiroshima (JP) --.

In the Claims:

Column 8, Claim 11, Line 30 should read:

-- fixed to the kick-up portion and covering seat belt --.

Signed and Sealed this

Tenth Day of March, 2009

JOHN DOLL
*Acting Director of the United States Patent and Trademark Office*